US005882541A

United States Patent [19]

Achtmann

[11] Patent Number: 5,882,541

[45] Date of Patent: Mar. 16, 1999

[54] BIODEGRADABLE FOAM COMPOSITIONS FOR EXTINGUISHING FIRES

[75] Inventor: Hans Achtmann, Industriestrasse 12, Postfach 4121, CH 6304, Zug, Switzerland

[73] Assignee: Hans Achtmann, New Canaan, Conn.

[21] Appl. No.: 743,387

[22] Filed: Nov. 4, 1996

[51] Int. Cl.$^6$ .................... A62D 1/00; B01J 13/00

[52] U.S. Cl. .................... 252/8.05; 252/2; 252/3; 252/307

[58] Field of Search .................... 252/2, 3, 8.05, 252/307

[56] References Cited

U.S. PATENT DOCUMENTS

| | | | |
|---|---|---|---|
| 4,060,489 | 11/1977 | Chiesa, Jr. | 252/3 |
| 4,306,979 | 12/1981 | Tsuji et al. | 252/3 |
| 4,536,298 | 8/1985 | Kamei et al. | 252/8.05 |
| 4,897,207 | 1/1990 | Greene | 252/2 |
| 4,999,119 | 3/1991 | Norman et al. | 252/3 |
| 5,085,786 | 2/1992 | Alm et al. | 252/8.05 |
| 5,207,932 | 5/1993 | Norman et al. | 252/3 |
| 5,225,095 | 7/1993 | DiMaio et al. | 252/307 |
| 5,391,721 | 2/1995 | Hanen et al. | 536/3 |
| 5,434,192 | 7/1995 | Thach et al. | 521/50 |
| 5,496,475 | 3/1996 | Jho et al. | 252/2 |
| 5,518,638 | 5/1996 | Buil et al. | 252/2 |
| 5,616,273 | 4/1997 | Clark et al. | 252/2 |

*Primary Examiner*—C. H. Kelly
*Attorney, Agent, or Firm*—Dorr, Carson, Sloan & Birney, P.C.

[57] ABSTRACT

Biodegradable foam compositions for extinguishing class B fires are disclosed that may be in either a liquid concentrate or a powder concentrate form. The concentrates comprise (1) a foaming group including a high-foaming surfactant such as an alkyl polyglycoside and a plurality of viscosity-reducing agents, for example, polyethylene glycol, and (2) a stiffening group including a water-soluble polymer such as a natural gum, e.g., xanthan gum, and a viscosity-reducing agent. The powder concentrate further comprises a sorption agent.

53 Claims, No Drawings

BIODEGRADABLE FOAM COMPOSITIONS FOR EXTINGUISHING FIRES

BACKGROUND OF THE INVENTION

1. Field of the Invention

The present invention relates, in general, to compositions for extinguishing fires. More particularly, the present invention relates to biodegradable foam compositions that are capable of extinguishing both hydrocarbon-based fires and water-soluble fuel-based fires.

2. Statement of the Problem

Hydrocarbon-based products, for example, crude oils and products derived from crude oils such as gasoline, jet fuels, etc., are extremely flammable. Fires involving such hydrocarbons sometimes occur, and when large amounts of such hydrocarbons are stored in one place (fuel bunkers or oil tanks), these fires can be extremely large and difficult to extinguish.

The use of foams to extinguish hydrocarbon-based fires has long been known. Foams generally extinguish such fires by smothering them, that is, preventing oxygen from reaching the combustible materials. Several types of foams have been used to extinguish hydrocarbon-based fires. For example, prior to about the mid-1960s, protein foams were used for this purpose. These foams are formulated with hydrolyzed protein, for example, hydrolyzed keratin, albumins and globulins. Typically such foams are also provided with ferrous sulfate to help provide a foaming action that is particularly useful for extinguishing hydrocarbon-based fires. However, these protein-based foams are not always effective—often because their use requires that a uniformly applied, heavy blanket of foam be applied over the entire fire. Any disruption in the integrity of these foams often results in a flare-up of the burning fuel. These hydrolyzed protein foaming agents also suffer from the disadvantage of having relatively short shelf lives.

In the mid-1960s, aqueous film-forming foams (AFFF) were developed. AFFF are less dense than protein foams and operate by spreading an aqueous film on the surface of hydrocarbon liquids, thus enhancing the speed at which fires involving such liquids can be extinguished. The aqueous film produced by AFFF results from the use of fluorochemical surfactants as ingredients. These fluorosurfactants produce very low surface tension values (15–20 dynes per cm) that permit AFFF using them to quickly spread as an aqueous film on the surface of hydrocarbon liquids. Unfortunately, fluorocarbons such as these are known toxicants and are extremely difficult to remove by biodegradation, either natural or accelerated. Thus, extinguishing a fire with compositions containing fluorocarbons leaves a toxic residue.

AFFF also may require frequent reapplication since any breaks in the fragile surfactant film over the combustible material sometimes allows the combustible material to reignite. This drawback led to development of various AFFF having improved barrier properties in the aqueous film. For example, U.S. Pat. No. 5,085,786 discloses an improved AFFF containing fluoroaliphatic amphoteric surfactants, fluoroaliphatic anionic surfactants, and short-chain alkyl ether sulfate hydrocarbon surfactants. These improvements notwithstanding, the use of AFFF still presents problems, and there remains a need for AFFF whose aqueous film barriers are less likely to break down, especially in fighting fires involving three-dimensional structures. Moreover, AFFF are not very effective in fighting fires involving water-soluble fuels such as alcohols. If AFFF are used on fires involving such fuels, they tend to be quickly dissolved and destroyed by the fuel itself.

Consequently, other types of foam have been developed to fight fires involving water-soluble fuels. They are called alcohol-resistant AFFF, or ARAFFF. In addition to the ingredients employed in AFFF, ARAFFF contain a water-soluble polymer that precipitates on contact with a water-soluble fuel and thereby provides a protective layer between the water-soluble fuel and the foam. Many ARAFFF have also proven effective in extinguishing fires of both hydrocarbons and water-soluble fuels. Again, ARAFFF are similar to AFFF in that they contain, in addition to a water-soluble polymer, one or more perfluoroalkyl surfactants that may be anionic, cationic, or nonionic, solvents such as glycols and/or glycol ethers. They also usually contain minor amounts of additive-type ingredients such as chelating agents, pH buffers, corrosion inhibitors, and the like.

ARAFFF were first disclosed in U.S. Pat. No. 4,060,489. This patent describes a foam containing a fluorocarbon surfactant and a silicone-containing sulfated surfactant, an imidazoline surfactant, a thixotropic polysaccharide such as scleroglucan (a polymeric form of glucose) or xanthan gum, N-methyl pyrrolidone-2 (a viscosity enhancer), ethylene glycol, and a foam-stabilizing hydrophilic resin. Other useful ARAFFF are disclosed in U.S. Pat. No. 4,306,979 to Tsuji et al., U.S. Pat. Nos. 4,999,119 and 5,207,932 to Norman et al., U.S. Pat. No. 5,391,721 to Hanen et al., and U.S. Pat. No. 5,496,475 to Jho et al.

The most common ingredient(s) in all AFFF and ARAFFF that have been developed to date are perfluoroalkyl surfactants. Unfortunately, these surfactants are known toxicants that are extremely difficult to remove from the environment once they have entered it. Thus, extinguishing a fire with currently known AFFF or ARAFFF leaves a nearly permanent, highly toxic perfluoroalkyl residue. Such perfluoroalkyl surfactants also usually represent up to 80% of the cost of an AFFF or ARAFFF concentrate. It therefore would be very desirable to reduce or eliminate perfluoroalkyl surfactant ingredients from fire-fighting foams for ecological as well as economic reasons if equally effective, and less costly, fire-fighting agents were available.

To this end, U.S. Pat. No. 5,207,932 (the '932 patent) discloses certain AFFF and ARAFFF in which perfluoroalkyl surfactants have been reduced in concentration by more than 40% without loss of fire-fighting performance. This is achieved by using alkyl polyglycoside surfactants in such compositions. For example, the '932 patent discloses an AFFF concentrate comprising a perfluoroalkyl surfactant, a solvent, and an alkyl polyglycoside. Its ARAFFF concentrates are comprised of a perfluoroalkyl surfactant, a solvent, an alkyl polyglycoside, and a water-soluble polymer. All embodiments of the '932 patent, however, still call for a perfluoroalkyl surfactant. Thus, although this invention helps to reduce the cost of AFFF and ARAFFF because of its call for reduced amounts of relatively expensive perfluoroalkyl surfactant ingredients, such surfactants are still contained in these compositions; hence, their use still implies environmental pollution.

It also should be noted that ARAFFF concentrates are typically diluted to different concentrations for use on different types of fires. For fires involving hydrocarbon liquids, ARAFFF concentrates are diluted at the time of application to a 3% concentration (that is, 3 parts concentrate to 97 parts water). Fires involving water-soluble fuels, however, require an ARAFFF concentration of 6% (6 parts of concentrate to 94 parts water.). This implies extra expense because of the larger amounts of concentrates needed for fires of this type. Some ARAFFF concentrates can be dilutely formulated for application to water-soluble fuel fires, e.g., those 3% solutions taught in U.S. Pat. No. 5,496,475; however, such ARAFFF are impractical to use because of their extremely high viscosities. For example, the prior art has found that in order to use a 3% dilution of ARAFFF, the amount of polysaccharide gums they contain must be reduced to lower the viscosity of the concentrated solution. However, this decrease in the amount of gums results in a composition that is decidedly less effective at extinguishing fires.

Several attempts have been made to lower the viscosity of ARAFFF without reducing the amount of polysaccharide gums in order to provide compositions that are effective at 3% strength. For example, U.S. Pat. Nos. 4,999,119 and 5,207,932 disclose the use of alkyl polyglycosides to help reduce the amounts of viscosity-enhancing polysaccharides. In the same vein, U.S. Pat. No. 5,496,475 teaches use of anionic copolymers such as methacrylic acid-acrylamide-methacrylate or methacrylic acid-N,N-dimethylacrylamide to reduce the viscosity of ARAFFF. Such compositions still however contain fluorosurfactants, hence their use still implies all the negative environmental and economic consequences previously noted.

It would be advantageous, therefore, to provide fire-fighting foam concentrate compositions that do not contain any fluorocarbon surfactants whatsoever and that can be applied at less than a 3% dilution and yet contain high concentrations of polysaccharide gums in order to provide more effective fire-fighting capabilities against both hydrocarbon and water-soluble fuel fires.

SUMMARY OF THE INVENTION

Applicant has discovered fire-fighting foam compositions that are particularly characterized by the fact that they do not contain any perfluoroalkyl surfactants, yet still are very effective fire-fighting agents. Moreover, they are particularly effective when applied in concentrations of less than about 5 vol % (and preferably less than about 3 vol %) to fires involving either hydrocarbon or water-soluble fuels (class B fires). Furthermore, all of the ingredients in these compositions are food grade or modified food grade materials that are readily biodegradable after application. Moreover, the stability and longevity of the foam produced by these compositions alleviate the need for multiple applications. These compositions also can be formulated as either liquid concentrates or powder concentrates.

The liquid concentrate embodiment of these hydrocarbon fire-fighting compositions, in its broadest sense, is generally comprised of two main functional groups of ingredients: a foaming group that includes a high-foaming surfactant and a plurality of viscosity-reducing agents; and a stiffening group that includes a water-soluble polymer and a viscosity-reducing agent. Preferably, these two groups are prepared separately and then mixed together in volumetric ratios ranging from about 7 parts to about 1 part of the foaming group to about 1 part of the stiffening group. A 3:1 foaming group:stiffening group volumetric ratio is particularly preferred when formulating the liquid concentrate forms of these compositions.

These compositions are stored in concentrated form until needed. To extinguish a fire, the liquid concentrates are diluted just prior to use with water to a concentration of about 3 vol % (that is, for example, about 3 vol % liquid concentrate to about 97 vol % water) and then applied to the fire. In many instances concentrations of even less than about 3 vol % (e.g., concentrations as low as 0.5 vol %) will be effective. Fresh water or sea water can be used to perform this dilution function.

The powder concentrate embodiment of this invention is very similar to the liquid concentrate embodiment in that it too is comprised of a foaming group that includes a high-foaming surfactant and a plurality of viscosity-reducing agents; a stiffening group that includes at least one water-soluble polymer and a viscosity-reducing agent. The powder concentrate, however, further comprises an absorption/adsorption agent such as magnesium carbonate or sodium carbonate. (Applicant also may refer to the absorption/adsorption agent as the "sorption agent" in this application.) Formulation of the powder concentrate differs from formulation of the liquid concentrate in that the foaming group is preferably mixed with the sorption agent before the resulting material is mixed with the stiffening group. Preferably these materials are mixed in volumetric ratios ranging from about 3 to about 5 parts of the foaming group/sorption agent to about 1 part of the stiffening group. A 3:1 foaming group-sorption agent/stiffening group volumetric ratio is particularly preferred. As in the case of the liquid concentrates, these powder concentrates may be diluted with either fresh water or sea water. Most preferably this dilution occurs immediately before use. The powder concentrate is preferably diluted to a concentration of about 5 vol % or less.

The foams resulting from these diluted liquid and powder concentrates can be applied with conventional fire-fighting equipment. For example, in either liquid or powder concentrate form, applicant's compositions can be applied via an eductor and ejected through a conventional aerating nozzle in order to generate a dense, stable foam that extinguishes a hydrocarbon fire by smothering it. In order to achieve a good mixing action of the powder forms of these materials, the powder concentrate may be placed in a powder hopper above a powered eductor that is incorporated into a fire hose. In either case, in addition to the smothering effect achieved by spraying the foam, as the foam gradually breaks down, it serves to emulsify any remaining fuel. The emulsion thus formed both assists in extinguishing the fire and resists any tendency of the combustible material to reignite. Furthermore, the emulsifying effect of these compositions on the fuel enhances natural biodegradation of the fuel. It also should be noted that depending on the type of nozzle through which the foam is applied, either the smothering action or the emulsifying action can be tailored to become the primary action by which a fire is extinguished, with the other action acting in a secondary capacity.

It also should be noted that the foam created by these compositions also tends to adhere to steep or vertical surfaces and thus can be used to put out fires that may be three dimensional in nature, for example, a flaming hydrocarbon dripping out of a vertical pipe onto the pipe's outer surface, or a fire resulting from an explosion that blows flaming material onto a vertical surface. This tendency to adhere to vertical surfaces is of immense practical use in fighting hydrocarbon fires involving structures of any kind.

DETAILED DESCRIPTIONS OF INVENTION

Applicant's foam compositions in both liquid and powder concentrate forms preferably comprise a high-foaming surfactant, at least one water-soluble polysaccharide polymer, and a plurality of viscosity-reducing agents. In the powder embodiment, a sorption agent such as magnesium carbonate or sodium carbonate is also employed to adsorb/absorb the surfactant and gum ingredients and thereby form an overall composition that is particulate (rather than liquid) in nature.

Any alkyl polyglycoside of low water content (that is, having high surfactant activity) can be used as the high-foaming surfactant in applicant's foam composition. The alkyl polyglycoside preferably will have the structure:

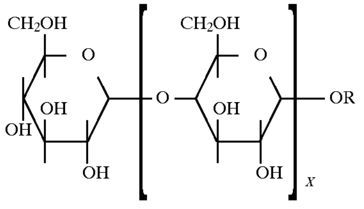

where x=0–5, and $R=C_{8-10}$ linear alkyl chain. Commercially available alkyl polyglycosides such as Triton BG-10 (Union Carbide) or AL 2575 (ICI) are particularly well suited for use in such formulations. Alkyl polyglycosides are generally formulated by a commercial process that reacts sugar molasses with alcohols. After such production, the alkyl polyglycosides contain about 2 wt % residual alcohol and about 30 wt % water. This amount of water is sufficient to bring about a hydration effect on the gum ingredient(s) of applicant's compositions, causing the compositions to solidify. Therefore, before the ingredients of the foam compositions are combined, it is necessary to reduce the water content of the alkyl polyglycoside. This can be done by vacuum distillation, or other conventional methods known to those skilled in the art. The water content of the alkyl polyglycoside is reduced from about 30 wt % to about 10 to about 15 wt % by the vacuum distillation process. The maximum water content of the alkyl polyglycoside used in the foam compositions described herein must preferably be less than about 15 wt %.

This reduction in water content causes the alkyl polyglycoside to develop a very high viscosity. In order to be able to work with the alkyl polyglycoside in the preparation of applicant's foam compositions, especially for the liquid concentrate embodiments thereof, a viscosity-reducing agent should be blended with the alkyl polyglycoside before any other ingredients are added. In the preferred embodiment of the foam composition, polyethylene glycol is blended under moderately high shear conditions with the dehydrated alkyl polyglycoside, and preferably polyethylene glycol having a molecular weight of between about 150 and about 300, but most preferably having a molecular weight of less than about 200. The polyethylene glycol reduces the viscosity of the dehydrated alkyl polyglycoside. After the polyethylene glycol is blended in, the viscosity of the resulting slurry can be lowered further if desired by using other viscosity-reducing agents such as propylene glycol. Alternatively, any straight-chain glycol or higher alcohol (for example, hexanol or octanol) having a carbon chain in the $C_5$ to $C_8$ range (that is, the longer-chain glycols and alcohols) can be employed as a second viscosity reducer. Other viscosity-reducing agents that may be used include the following: (1) polyethoxylated linear secondary alcohols having the general formula $C_{11-15}H_{23-31}O[CH_2CH_2O]_xH$, in which the amount of ethoxylation falls between 60 and 70 wt % (such a polyethoxylated linear secondary alcohol is commercially available from Union Carbide under the trade designation Tergitol S 15-7®); (2) a low-viscosity surfactant of high activity (that is, having a low water content) such as a polyethoxylated alkanolamide having the general formula:

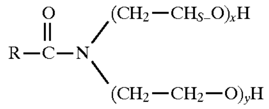

where x+y=moles of ethylene oxide and R is a fatty alkyl group. A commercially available polyethoxylated alkanolamide that is particularly preferred for use in applicant's compositions is Alkamide DC-212® from Rhone-Poulenc. Other potential viscosity-reducing agents that can be employed in the foam compositions of the present invention include polyethoxylated sorbitan monolaurate, phosphate esters, and diethylene glycol monobutyl ether. It should also be noted that all the above-listed viscosity-reducing agents also act as freezing point depressors when added to applicant's compositions.

The compositions of the present invention also comprise at least one water-soluble polysaccharide polymer, preferably a heteropolysaccharide polymer. Such a polymer serves to "stiffen" the foam produced by such compositions after they are mixed with water. By "stiffen" applicant means that the foam resulting from use of the compositions (liquid concentrates or powder concentrates) of this patent disclosure is strengthened so that when it is used as a fire-fighting agent, its smothering effect and longevity are increased. This stiffening effect also may be the cause of the ability of the foams produced by the hereindescribed compositions to adhere to vertical surfaces.

The most preferred water-soluble polymers for use in applicant's formulations are natural gums. Natural gums are carbohydrate-high polymers that are insoluble in alcohol and other organic solvents, but generally soluble or dispersible in water. Natural gums are hydrophilic polysaccharides composed of monosaccharide units joined by glycosidic bonds. Xanthan gum is preferably used as the water-soluble polymer in applicant's compositions. Xanthan gum is a heteropolysaccharide polymer comprising D-glucosyl, D-mannosyl, and D-glucosyluronic acid residues. In one of the most preferred embodiments of the present invention, a second water-soluble polymer, preferably guar gum (or its derivatives, such as hydroxypropyl guar or guar hydroxypropyl trimonium chloride), is also included (preferably as a component of the stiffening group). Most preferably the second water-soluble polymer is used in amounts up to about 60 wt % of the stiffening group. Guar gum is a water-soluble plant mucilage. Its water-soluble portion (85%) is called guaran, and it consists of 35% galactose and 63% mannose, probably combined in a polysaccharide, and further containing 5 to 7% protein. Xanthan gum and guar gum, when combined, act in synergistic fashion to provide a greater than expected viscosity than that which would be predicted on the basis of the characteristics of each of the two gums. This quality may form or contribute to the ability of applicant's compositions to adhere to steep or even vertical surfaces. This synergism also may account for the enhanced resistance to breakdown of the foam barrier formed by the compositions relative to that of many other foaming agents found in the prior art. In one of the more preferred embodiments of the foam compositions of this invention, xanthan gum having a particle size of about 50 to about 250 mesh and guar gum having a particle size of about 300 to about 500 mesh are employed.

As discussed above, applicant's foam compositions can be produced in two separate embodiments, one being a liquid concentrate and the second being a powder concentrate. Both the liquid concentrate embodiment and the powder concentrate embodiment are diluted immediately before use with either fresh water or sea water. The liquid concentrate is preferably diluted to from about 0.5 vol % to about 3 vol % (for example, about 2.5 vol % concentrate and 98.5 vol % water), whereas the powder concentrate is preferably diluted to from about 0.5 vol % to about 5 vol %. It also should be noted that it is important to the present invention to minimize any water contact with the gum ingredient(s) of the stiffening group before use of the foam compositions in either liquid or powder embodiments. If water is allowed to contact the gums of the foam compositions during storage, for instance, this contact will result in premature solidifying of the compositions.

a) Liquid concentrate

The liquid concentrate embodiment of applicant's foam compositions comprises a foaming group and a stiffening group. This foaming group has, in the preferred embodiment of this invention, two kinds of ingredients: an alkyl polyglycoside and a plurality of viscosity-reducing agents. The alkyl polyglycoside is dehydrated as described above, and then mixed with a first viscosity-reducing agent, preferably a polyethylene glycol of less than 200 molecular weight. A second viscosity-reducing agent, preferably propylene glycol, is then added. However, as described above, other potential agents that can be employed as the second viscosity-reducing agent include straight-chain alcohols ($C_5$ to $C_8$), linear secondary ethoxylated alcohols, and polyethoxylated alkanolamides. In a preferred embodiment, the alkyl polyglycoside will preferably comprise from about 45 wt % to about 75 wt % of the foaming group, the polyethylene glycol will preferably comprise from about 10 wt % to about 55 wt % of the foaming group, and the propylene glycol will preferably comprise from about 10 wt % to about 55 wt % of the foaming group. In an even more preferred embodiment, the alkyl polyglycoside comprises about 52 wt % of the entire liquid concentrate, the polyethylene glycol comprises about 15 wt % of the entire liquid concentrate, and the propylene glycol comprises about 7 wt % of the entire liquid concentrate.

Alternative formulations of the foaming group have also been discovered to be effective components in the liquid concentrate embodiment of the compositions of this patent disclosure. These embodiments are described in the following examples.

EXAMPLE I

| Ingredient | Range (wt % foaming group) | Preferred (wt % foaming group) |
|---|---|---|
| Alkyl polyglycoside | 45–75 | 70 |
| Polyethylene glycol 200 | 10–55 | 10 |
| Hexanol and/or octanol | 10–75 | 20 |

EXAMPLE II

| Ingredient | Range (wt % foaming group) | Preferred (wt % foaming group) |
|---|---|---|
| Alkyl polyglycoside | 45–75 | 70 |
| Polyethylene glycol 200 | 10–45 | 10 |
| Linear secondary ethoxylated alcohol | 10–40 | 20 |

EXAMPLE III

| Ingredient | Range (wt % foaming group) | Preferred (wt % foaming group) |
|---|---|---|
| Alkyl polyglycoside | 45–75 | 70 |
| Polyethylene glycol 200 | 10–75 | 10 |
| Propylene glycol | 10–45 | 8 |
| Polyethoxylated alkanolamide | 5–15 | 12 |

The ingredients of the stiffening group, in one preferred embodiment, include about 10 wt % to about 45 wt % of xanthan gum and about 0.05 wt % to about 25 wt % of guar gum (as measured against the weight of the stiffening group alone) or, optionally, one of the derivatives of guar gum such as hydroxypropyl guar or guar hydroxypropyl trimonium chloride. In an even more preferred embodiment, the stiffening group includes about 18 wt % of xanthan gum and about 17 wt % of guar gum derivative measured against the weight of the stiffening group alone. This quantity translates to 9 wt % of xanthan gum and about 8 wt % of guar gum as measured against the weight of the entire concentrate. However, it is important to note that effective foam compositions can be obtained with a range of gum mixtures from the use of xanthan gum alone to up to about 60 wt % (of the stiffening group) guar or guar derivative. The xanthan gum and the guar gum or guar derivative are preferably in powder form. After the gums are thoroughly mixed in a mill, a viscosity-reducing agent is added to the gum combination with constant stirring until a mobile slurry is obtained. The viscosity-reducing agent is preferably polyethylene glycol of less than about 200 molecular weight and constitutes about 9 wt % of the entire concentrate. In addition to (or instead of) the polyethylene glycol, any 100% active (meaning no water content) nonionic or ionic surfactant that is not an actively an anti-foamer may be employed to assist in reducing the viscosity of the stiffening group. For example, phosphate esters and polyethoxylated sorbitan monolaurate (having about 50 to about 60 moles of ethylene oxide) are suitable surfactants for use as such additional viscosity reducers. Other substances that can fulfill the role of an additional viscosity reducer in the stiffening group include longer-chain glycols having straight-chains, higher alcohols having straight chains, diethylene glycol monobutyl ether, and polyethoxylated linear secondary alcohols.

Once the foaming group and the stiffening group have been separately prepared, they are blended together under low shear conditions at a volumetric ratio of about 7 parts to about 1 part foaming group to about 1 part stiffening group. Most preferably, about 3 parts foaming group is mixed with about 1 part stiffening group to form the liquid concentrates.

b) Powder concentrates

The powder concentrate embodiments of applicant's compositions are very similar to the liquid concentrates. In one highly preferred embodiment of the powder concentrate, the foaming group comprises an alkyl polyglycoside and a plurality of viscosity-reducing agents, preferably polyethylene glycol (and still more preferably polyethylene glycol having a molecular weight of less than about 200) and propylene glycol. It should be noted that the alkyl polyglycoside does not need to be dehydrated before use in the foaming group of the powder concentrates as is done for the liquid concentrates. As described below, the foaming group is vacuum dried before it is combined with the stiffening group, and this drying process removes sufficient water (and residual alcohols) to provide an alkyl polyglycoside having the preferred water content of less than about 15%. The ingredients of the foaming group are preferably present in the following concentrations: the alkyl polyglycoside will preferably comprise from about 45 wt % to about 75 wt % of the foaming group, the polyethylene glycol will preferably comprise from about 10 wt % to about 55 wt % of the foaming group, and the propylene glycol will preferably comprise from about 10 wt % to about 55 wt % of the foaming group. In an even more preferred embodiment, which differs slightly from the liquid concentrate, the alkyl polyglycoside will comprise about 45 wt % of the weight of the entire powder concentrate, the polyethylene glycol will comprise about 13 wt % of the entire powder concentrate, and the propylene glycol will comprise about 6 wt % of the entire powder concentrate.

The stiffening group ingredients for the powder concentrate also are similar to the stiffening group ingredients for the liquid concentrate. In one particularly preferred embodiment, xanthan gum (about 8 wt % of the entire concentrate) is mixed with hydroxypropyl guar (about 6 wt % of the entire concentrate) and a viscosity reducer (about 7 wt % of the entire concentrate) such as polyethylene glycol and/or an ionic or nonionic surfactant, e.g., polyethoxylated sorbitan monolaurate or phosphate esters or the other substances that can fill this role as described above for the liquid concentrate.

In the powder concentrate, however, as opposed to the liquid concentrate, a sorption agent is also added. Sorption agents that can be used include any nonhygroscopic, finely milled carbonate. Sodium carbonate and magnesium carbonate are particularly useful for the practice of this invention. In one preferred embodiment, about 5 wt % to about 20 wt % (as measured against the entire powder concentrate) magnesium carbonate is employed as the sorption agent. In an even more preferred embodiment, about 15 wt % magnesium carbonate is used.

In the most preferred methods for making the powder concentrates of this patent disclosure, the ingredients of the stiffening group are mixed with each other in a mixing step that is separate from the mixing of the ingredients that make up the foaming group. Thus, to formulate the powder concentrate, alkyl polyglycoside is mixed with polyethylene glycol and propylene glycol and the resulting mixture is stirred. This mixture is then slowly added to a sorption agent such as magnesium carbonate and thoroughly stirred until a uniform powder slurry exhibiting no visible separated liquid is created. This powder slurry is then further dried in a vacuum oven and filtered through a relatively coarse, e.g., 1000 mesh, screen. In a separate process, the gum ingredients of the stiffening group are mixed with polyethylene glycol and/or surfactants and the resulting slurry is also vacuum dried and sifted through a 1000-mesh screen. (It should be noted that the gum/polyethylene slurry can be used as is without the drying and sifting steps; however, a more favorable combination with the foaming group is achieved when the stiffening group slurry is dried and sifted.) The stiffening group is then combined with the foaming group/sorption agent mixture at a volumetric ratio of from about 3 parts to about 5 parts of foaming group/sorption agent to about 1 part of stiffening group, or most preferably at a volumetric ratio of about 3 parts of foaming group/sorption agent to about 1 part of stiffening group.

Application

The foam compositions are most readily applied to fires directly from their storage/transportation containers using a conventional eductor attached to a hose. It is preferable to use an eductor, which mixes the concentrates with water at the time of application, because if the concentrates are premixed with water before application, the compositions will solidify. As the concentrates are picked up by the eductor, they are diluted by the water to form a concentration of about 0.5 vol % to about 5 vol %, but preferably less than 3 vol %. The use of conventional aerating (aspirating) nozzles is also contemplated. Such aerating nozzles produce a dense foam that commences to stiffen or rubberize under the effect of the hydrating gums and thereby make the resulting foam impervious to even the most volatile components of the fuel. Such foams principally extinguish hydrocarbon-based fires by smothering them. When the compositions are applied from a straight or narrow fog nozzle, however, the compositions produce a much thinner foam. In this case, it is the emulsifying action of the compositions rather than the smothering action that becomes the primary agent of extinguishment, backed up by the thinner foam generated on impact with the fuel. The concentrates can also be applied with a hand-held water fire extinguisher if its pressurizing system is modified to eject the concentrate into the water at the moment the system is ready for use, and preferably not more than about 15 seconds before.

The rate of hydration of the xanthan/guar gum blend influences the effectiveness of the compositions. The rate of hydration is controlled largely by the particle size of the gum mixture and its rate of solution in water. The rate of hydration is averaged for the time, under normally employed water pressures, from first contact with water in the eductor venturi, aeration at the nozzle, and aerial delivery to impact with the burning fuel. Too slow a rate of hydration (larger particle size) and the compositions will not have time to rubberize after they leave the nozzle. Too fast a rate of hydration will cause the compositions to partially rubberize in the hose line and prevent the aeration of the foam at the nozzle.

Performance of the Foam Compositions

In order to evaluate the performance of the liquid concentrate against class B fires, it was submitted for independent testing by Israeli Oil Refineries, Ltd. (Haifa Refinery, P.O. Box 4, Haifa 31000, Israel). Three tests were carried out as follows:

Test 1

In this test, a large-scale fire was set in a concrete pit of 1,100 square feet containing three-dimensional metal obstructions. Jet fuel was floated above water and ignited. The fire was allowed to establish for 1 minute before extinguishment began. The system employed was a standard pumper using 1.5-inch lines at 100 gallons per minute (gpm) with a 95-gpm eductor to pick up the liquid concentrate.

| | |
|---|---|
| Burn area: | 1,100 square feet |
| Fuel: | JET-A |
| Quantity: | 660 U.S. gallons |
| Fuel depth: | 1 inch |
| Nozzle: | One 95 gpm, non-aspirating(straight) |
| RESULTS: | |
| Extinguishing time: | 50 secs |
| Application concn: | 0.5% |
| Total liquid used: | Water = 82 US gallons |
| | Formula = 0.5 US gallon |

Test 2:

This test evaluation was performed in a round steel pan of 40 square feet. Thirty (30) gallons of Jet-A fuel were floated on an equal volume of water to give a 2-cm fuel depth. The fuel was ignited and allowed to preburn for 30 seconds after full establishment.

A single U.S. standard 2.5-gallon hand-held fire extinguisher was used with an aspirating nozzle.

| | |
|---|---|
| Burn area: | 40 square feet |
| Fuel: | JET-A |
| Quantity: | 30 U.S. gallons |
| Preburn: | 30 seconds |
| Extinguisher: | 2.5-gallon U.S. standard water type. |
| RESULTS: | |
| Extinguishing time: | 7 seconds |
| Product/water concn: | 2% |
| Total product used: | 0.006 gallon |

Test 3

This third test was set up as described above for test no. 2 but carried out under the strict conditions of the Euronorm EN-3/113B rules. In this test, though, the fuel was changed to heptane and the preburn was the statutory one minute.

| | |
|---|---|
| Burn area: | 40 square feet |
| Fuel: | Heptane |
| Quantity: | 30 US gallons |
| Fuel depth: | 2 cm |
| Preburn: | 1 minute |
| Extinguisher: | 2.5-gallon US standard/aspirating nozzle |
| RESULTS: | |
| Extinguishing time: | 25 seconds |
| Product/water concn: | 2% |
| Total product used: | 0.03 US gallon |

It is clear from the results of the three tests that applicant's foam compositions are capable of effectively extinguishing class B fires.

While this invention generally has been described in terms of the general discussions, specific examples and preferred embodiments, none of these should be taken individually as a limit upon the overall inventive concepts described herein.

Thus having disclosed this invention, what is claimed is:

1. A liquid concentrate for producing a foam composition for extinguishing fires, said concentrate comprising:

a foaming group comprised of:

(a) a surfactant that is not a perfluoroalkyl surfactant and that has a water content of less than about 15 wt %; and (b) a plurality of viscosity-reducing agents; and a stiffening group comprised of:

(a) a water-soluble polymer; and (b) a viscosity-reducing agent.

2. The liquid concentrate of claim 1 wherein the surfactant constitutes about 45 wt % to about 75 wt % of the foaming group.

3. The liquid concentrate of claim 1 wherein the surfactant is an alkyl polyglycoside containing about 10 to about 15 wt % water and constituting about 45 wt % to about 75 wt % of the foaming group.

4. The liquid concentrate of claim 1 wherein the surfactant is an alkyl polyglycoside containing about 10 to about 15 wt % water and constituting about 70 wt % of the foaming group.

5. The liquid concentrate of claim 1 wherein the surfactant is an alkyl polyglycoside constituting about 52 wt % of the liquid concentrate.

6. The liquid concentrate of claim 1 wherein the plurality of viscosity-reducing agents employed in the foaming group are selected from at least two of the group consisting of longer-chain glycols having straight-chains, higher alcohols having straight chains, polyethylene glycol having a molecular weight of less than about 300, propylene glycol, diethylene glycol monobutyl ether, polyethoxylated sorbitan monolaurate, phosphate esters, sorbitan monolaurate, polyethoxylated alkanolamides, and polyethoxylated linear secondary alcohols.

7. The liquid concentrate of claim 1 wherein the plurality of viscosity-reducing agents employed in the foaming group are polyethylene glycol having a molecular weight of less than about 200 and constituting from about 10 wt % to about 55 wt % of said foaming group and propylene glycol constituting from about 10 wt % to about 55 wt % of said foaming group.

8. The liquid concentrate of claim 1 wherein the plurality of viscosity-reducing agents employed in the foaming group are polyethylene glycol constituting about 20 wt % of said foaming group and propylene glycol constituting about 10 wt % of said foaming group.

9. The liquid concentrate of claim 1 wherein the plurality of viscosity-reducing agents employed in the foaming group are polyethylene glycol constituting about 15 wt % of said liquid concentrate and propylene glycol constituting about 7 wt % of said liquid concentrate.

10. The liquid concentrate of claim 1 wherein the water-soluble polymer is a polysaccharide polymer.

11. The liquid concentrate of claim 1 wherein the water-soluble polymer is xanthan gum that constitutes from about 10 wt % to about 45 wt % of the stiffening group.

12. The liquid concentrate of claim 1 wherein the water-soluble polymer is xanthan gum that constitutes about 9 wt % of said liquid concentrate.

13. The liquid concentrate of claim 1 wherein the viscosity-reducing agent employed in the stiffening group is selected from the group consisting of longer-chain glycols having straight chains, higher alcohols having straight chains, polyethylene glycol having a molecular weight of less than about 300, propylene glycol, polyethoxylated sorbitan monolaurate, phosphate esters, polyethoxylated alkanolamides, polyethoxylated linear secondary alcohols, and diethylene glycol monobutyl ether.

14. The liquid concentrate of claim 1 wherein the viscosity-reducing agent employed in the stiffening group is polyethylene glycol having a molecular weight of less than about 200 that constitutes about 9 wt % of said liquid concentrate.

15. The liquid concentrate of claim 1 that further comprises a stiffening group having a second water-soluble polymer.

16. The liquid concentrate of claim 1 that further comprises a stiffening group having a second water-soluble polymer selected from the group consisting of guar gum, hydroxypropyl guar, and guar hydroxypropyl trimonium chloride that constitutes from about 0.05 wt % to about 25 wt % of said stiffening group.

17. The liquid concentrate of claim 1 that further comprises a stiffening group having a second water-soluble polymer selected from the group consisting of guar gum, hydroxypropyl guar, and guar hydroxypropyl trimonium chloride that constitutes about 8 wt % of said liquid concentrate.

18. The liquid concentrate of claim 1 wherein the foaming group and the stiffening group are combined in a volumetric ratio of about 7 parts to about 1 part of said foaming group to about 1 part of said stiffening group.

19. The liquid concentrate of claim 1 wherein the foaming group and the stiffening group are combined in a volumetric ratio of about 3 parts of said foaming group to about 1 part of said stiffening group.

20. The liquid concentrate of claim 1 to which water is added in a quantity such that the resulting liquid concentrate/water composition becomes a foam capable of extinguishing a fire.

21. The liquid concentrate of claim 1 to which water is added in a quantity such that the resulting liquid concentrate/water composition is comprised of from about 0.5 vol % to about 3.0 vol % liquid concentrate and becomes a foam capable of extinguishing a fire.

22. A liquid concentrate for producing a foam composition, said concentrate comprising:

a foaming group comprised of:

(a) an alkyl polyglycoside that is not a perfluoroalkyl surfactant and that contains no more than about 10 wt % to about 15 wt % water and constituting about 52 wt % of said liquid concentrate;

(b) polyethylene glycol of 200 or less molecular weight and constituting about 15 wt % of said liquid concentrate; and (c) propylene glycol constituting about 7 wt % of said liquid concentrate; and a stiffening group comprised of:

(a) xanthan gum constituting about 9 wt % of said liquid concentrate;

(b) a gum selected from the group consisting of guar gum, hydroxypropyl guar, and guar hydroxypropyl trimonium chloride and constituting about 8 wt % of said liquid concentrate; and (c) polyethylene glycol of 200 or less molecular weight and constituting about 9 wt % of said liquid concentrate; and wherein said foaming group and said stiffening group are mixed in about a 3:1 volumetric ratio.

23. A powder concentrate for producing a foam composition for extinguishing fires, said concentrate comprising:

a foaming group comprised of:

(a) a surfactant that is not a perfluoroalkyl surfactant and that has a water content of less than about 15 wt %; and (b) a plurality of viscosity-reducing agents;

a stiffening group comprised of:

(a) a water-soluble polymer; and (b) a viscosity-reducing agent; and a sorption agent.

24. The powder concentrate of claim 23 wherein the surfactant constitutes about 45 wt % to about 75 wt % of the foaming group.

25. The powder concentrate of claim 23 wherein the surfactant is an alkyl polyglycoside containing about 10 to about 15 wt % water and constituting about 45 wt % to about 75 wt % of the foaming group.

26. The powder concentrate of claim 23 wherein the surfactant is an alkyl polyglycoside containing about 10 to about 15 wt % water and constituting about 70 wt % of the foaming group.

27. The powder concentrate of claim 23 wherein the surfactant is an alkyl polyglycoside constituting about 45 wt % of the powder concentrate.

28. The powder concentrate of claim 23 wherein the plurality of viscosity-reducing agents employed in the foaming group are selected from at least two of the group consisting of longer-chain glycols having straight chains, higher alcohols having straight chains, polyethylene glycol having a molecular weight of less than about 300, propylene glycol, diethylene glycol monobutyl ether, polyethoxylated sorbitan monolaurate, polyethoxylated alkanolamides, and polyethoxylated linear secondary alcohols.

29. The powder concentrate of claim 23 wherein the plurality of viscosity-reducing agents employed in the foaming group are polyethylene glycol having a molecular weight of less than about 200 and constituting from about 10 wt % to about 55 wt % of said foaming group and propylene glycol constituting from about 10 wt % to about 55 wt % of said foaming group.

30. The powder concentrate of claim 23 wherein the plurality of viscosity-reducing agents employed in the foaming group are polyethylene glycol having a molecular weight of less than about 200 and constituting about 20 wt % of said foaming group and propylene glycol constituting about 10 wt % of said foaming group.

31. The powder concentrate of claim 23 wherein the plurality of viscosity-reducing agents employed in the foaming group are polyethylene glycol having a molecular weight of less than about 200 and constituting about 13 wt % of said powder concentrate and propylene glycol constituting about 6 wt % of said powder concentrate.

32. The powder concentrate of claim 23 wherein the water-soluble polymer is a polysaccharide polymer.

33. The powder concentrate of claim 23 wherein the water-soluble polymer is xanthan gum that constitutes from about 10 wt % to about 45 wt % of the stiffening group.

34. The powder concentrate of claim 23 wherein the water-soluble polymer is xanthan gum that constitutes about 8 wt % of said powder concentrate.

35. The powder concentrate of claim 23 wherein the viscosity-reducing agent employed in the stiffening group is selected from the group consisting of longer-chain glycols having straight chains, higher alcohols having straight chains, polyethylene glycol having a molecular weight of less than about 300, propylene glycol, diethylene glycol monobutyl ether, polyethoxylated sorbitan monolaurate, phosphate esters, sorbitan monolaurate, polyethoxylated alkanolamides, and polyethoxylated linear secondary alcohols.

36. The powder concentrate of claim 23 wherein the viscosity-reducing agent employed in the stiffening group is polyethylene glycol having a molecular weight of less than 200 that constitutes about 7 wt % of said powder concentrate.

37. The powder concentrate of claim 23 wherein the sorption agent is selected from the group consisting of sodium carbonate and magnesium carbonate.

38. The powder concentrate of claim 23 wherein the sorption agent is selected from the group consisting of sodium carbonate and magnesium carbonate and constitutes from about 5 wt % to about 20 wt % of said powder concentrate.

39. The powder concentrate of claim 23 wherein the sorption agent is magnesium carbonate constituting about 15 wt % of said powder concentrate.

40. The powder concentrate of claim 23 that further comprises a stiffening group having a second water-soluble polymer.

41. The powder concentrate of claim 23 that further comprises a stiffening group having a second water-soluble polymer selected from the group consisting of guar gum, hydroxypropyl guar, and guar hydroxypropyl trimonium chloride that constitutes from about 0.05 wt % to about 25 wt % of said stiffening group.

42. The powder concentrate of claim 23 that further comprises a stiffening group having a second water-soluble polymer selected from the group consisting of guar gum, hydroxypropyl guar, and guar hydroxypropyl trimonium chloride that constitutes about 6 wt % of said powder concentrate.

43. The powder concentrate of claim 23 wherein the foaming group and sorption agent are mixed and then the resulting foaming group/sorption agent mixture is combined with the stiffening group in a volumetric ratio of about 3 parts to about 5 parts of said foaming group/sorption agent mixture to about 1 part of said stiffening group.

44. The powder concentrate of claim 23 wherein the foaming group and sorption agent are mixed and then the resulting foaming group/sorption agent mixture is combined with the stiffening group in a volumetric ratio of about 3 parts of said foaming group/sorption agent mixture to about 1 part of said stiffening group.

45. The powder concentrate of claim 23 to which water is added in a quantity such that the resulting powder concentrate/water composition becomes a foam capable of extinguishing a fire.

46. The powder concentrate of claim 23 to which water is added in a quantity such that the resulting powder concentrate/water composition is comprised of from about 0.5 vol % to about 5 vol % powder concentrate and becomes a foam capable of extinguishing a fire.

47. A powder concentrate for producing a foam composition for extinguishing fires, said concentrate comprising:

a foaming group comprised of:

(a) an alkyl polyglycoside that is not a perfluoroalkyl surfactant and that contains no more than about 10 wt % to about 15 wt % water and constituting about 45 wt % of said powder concentrate; and (b) polyethylene glycol constituting about 6 wt % of said powder concentrate; and a stiffening group comprised of:

(a) xanthan gum constituting about 8 wt % of said powder concentrate;

(b) a gum selected from the group consisting of guar gum, hydroxypropyl guar, and guar hydroxypropyl trimonium chloride and constituting about 6 wt % of said powder concentrate; and (c) polyethylene glycol of 200 or less molecular weight constituting about 7 wt % of said powder concentrate; and magnesium carbonate constituting about 15 wt % of said powder concentrate; and wherein said foaming group is first mixed with said magnesium carbonate and the resulting foaming group/magnesium carbonate mixture is them mixed with said stiffening group in a volumetric ratio of about 3 parts foaming group/magnesium carbonate to about 1 part stiffening group.

48. A method for extinguishing fires comprising applying to said fires a liquid concentrate for producing a foam composition, said concentrate comprising:

a foaming group comprised of:

(a) an alkyl polyglycoside that is not a perfluoroalkyl surfactant and that contains no more than about 10 wt % to about 15 wt % water and constituting about 52 wt % of said liquid concentrate; and (b) polyethylene glycol of 200 or less molecular weight constituting about 15 wt % of said liquid concentrate; and (c) propylene glycol constituting about 7 wt % of said liquid concentrate; and a stiffening group comprised of:

(a) xanthan gum constituting about 9 wt % of said liquid concentrate;

(b) a gum selected from the group consisting of guar gum, hydroxypropyl guar, and guar hydroxypropyl trimonium chloride and constituting about 8 wt % of said liquid concentrate;

(c) polyethylene glycol of 200 or less molecular weight constituting about 9 wt % of said liquid concentrate; and wherein said foaming group and said stiffening group are mixed in about a 3:1 volumetric ratio.

49. The method of claim 48 that further comprises the step of diluting said liquid concentrate to a concentration of less than about 3 vol % with water immediately before application.

50. The method of claim 49 wherein the dilution step is achieved with an eductor.

51. A method for extinguishing fires comprising applying to said fires a powder concentrate for producing a foam composition, said concentrate comprising:

a foaming group comprised of:

(a) an alkyl polyglycoside that is not a perfluoroalkyl surfactant and that contains no more than about 10 wt % to about 15 wt % water and constituting about 45 wt % of said powder concentrate; and (b) polyethylene glycol of 200 or less molecular weight constituting about 13 wt % of said powder concentrate; and (c) propylene glycol constituting about 6 wt % of said powder concentrate; and a stiffening group comprised of:

(a) xanthan gum constituting about 8 wt % of said powder concentrate;

(b) a gum selected from the group consisting of guar gum, hydroxypropyl guar, and guar hydroxypropyl trimonium chloride and constituting about 6 wt % of said powder concentrate; and (c) polyethylene glycol of 200 of less molecular weight constituting about 7 wt % of said powder concentrate; and magnesium carbonate constituting about 15 wt % of said power concentrate; and wherein said foaming group is first mixed with said magnesium carbonate and the resulting foaming group/magnesium carbonate mixture is then mixed with said stiffening group in a volumetric ratio of about 3 parts foaming group magnesium carbonate to about 1 part stiffening group.

52. The method of claim 51 that further comprises the step of diluting said powder concentrate to a concentration of less than about 5 vol % with water immediately before application.

53. The method of claim 52 wherein the dilution step is achieved with an eductor.

* * * * *